US012270252B2

(12) United States Patent
Jiang

(10) Patent No.: US 12,270,252 B2
(45) Date of Patent: Apr. 8, 2025

(54) ROLLING CURTAIN AND ASSEMBLING METHOD THEREOF

(71) Applicant: HUNAN QIANYE PRECISION SPRING TECHNOLOGY CO., LTD., Hunan (CN)

(72) Inventor: Xiaoping Jiang, Hunan (CN)

(73) Assignee: HUNAN QIANYE PRECISION SPRING TECHNOLOGY CO., LTD., Hunan (CN)

( * ) Notice: Subject to any disclaimer, the term of this patent is extended or adjusted under 35 U.S.C. 154(b) by 211 days.

(21) Appl. No.: 18/116,483

(22) Filed: Mar. 2, 2023

(65) Prior Publication Data

US 2024/0125174 A1 Apr. 18, 2024

(30) Foreign Application Priority Data

Oct. 18, 2022 (CN) ......................... 202211275214.0

(51) Int. Cl.
*E06B 9/74* (2006.01)
*E06B 9/60* (2006.01)
*E06B 9/72* (2006.01)

(52) U.S. Cl.
CPC .................. *E06B 9/74* (2013.01); *E06B 9/60* (2013.01); *E06B 9/72* (2013.01)

(58) Field of Classification Search
CPC ..... E06B 9/44; E06B 9/60; E06B 9/72; E06B 9/74
See application file for complete search history.

(56) References Cited

U.S. PATENT DOCUMENTS 8,919,419 B2 * 12/2014 Mullet ...................... E06B 9/62 160/310
10,407,980 B2 * 9/2019 Hall ........................ E06B 9/322
10,988,981 B2 * 4/2021 Lei .......................... E06B 9/324
11,649,674 B2 * 5/2023 Valkenburg ............... E06B 9/80 160/300
11,761,263 B1 * 9/2023 Xu ............................ E06B 9/44 160/315
2013/0199735 A1 * 8/2013 Colson ...................... E06B 9/80 160/84.02
2014/0216666 A1 * 8/2014 Smith ....................... E06B 9/90 160/84.04
2016/0356081 A1 * 12/2016 Sung ....................... E06B 9/306
2017/0218694 A1 * 8/2017 Sung ....................... E06B 9/322

FOREIGN PATENT DOCUMENTS

CN 211924027 U 11/2020

* cited by examiner

*Primary Examiner* — Beth A Stephan
(74) *Attorney, Agent, or Firm* — Cooper Legal Group, LLC

(57) ABSTRACT

The present application relates to a rolling curtain and an assembling method thereof. The rolling curtain includes a roller, a curtain cloth, a lower rod, a motor, a spiral spring device, a first fixed bracket and a second fixed bracket. The spiral spring device further includes a fixed shaft, an outer rotatable frame, a spiral spring and an inserting pin. Pin holes corresponding to each other are provided on the fixed shaft and the outer rotatable frame respectively. The spiral spring is tightened and mounted in the outer rotatable frame. The inserting pin is inserted in the pin holes of the fixed shaft and the outer rotatable frame to fixedly connect the fixed shaft tot the outer rotatable frame.

11 Claims, 10 Drawing Sheets

ROLLING CURTAIN AND ASSEMBLING METHOD THEREOF

CROSS-REFERENCE TO RELATED APPLICATION

This application claims the priority and benefit of Chinese patent application serial no. 202211275214.0, filed on Oct. 18, 2022. The entirety of Chinese patent application serial no. 202211275214.0 is hereby incorporated by reference herein and made a part of this specification.

TECHNICAL FIELD

The present application relates to a field of cordless curtain and, in particular, relates to a rolling curtain and an assembling method thereof.

BACKGROUND ART

With the development of the society and the innovation of technologies, the daily life is increasingly intelligentized. More and more intelligent furniture appears in our daily life. As a daily necessity, an electric curtain is a popular and commonly used intelligent furniture, which adopts different control manners, such as remote controller, wire control, and voice control. It can be also closed at a set timing. Existing electric curtains are generally driven by a motor with reducer. However, they can not be opened or closed by hand if there is a power cut, which may significantly influence the user experience.

China patent application no. CN211924027U, titled "Force Balance Assembly of Cordless Curtain", discloses a force balance assembly. The force balance assembly adopts a variable-force spiral spring. By setting related performance parameters and numbers of the spiral spring, a torque force of the spiral spring and the gravity of the curtain cloth are kept at a balance state during the stroke of the curtain, so that the curtain can hover at any position. It is required only a small outer force to break the force balance, and lift the curtain by pushing or pulling, which provides an excellent experience for user.

In addition, considering different sizes, for example, various lengths and widths, of a window, different materials of curtains, and different weight/unit area of curtains of different materials, manufacturers produce a variety of spiral spring devices and rollers with different specifications, so that a customer can choose and match up. This satisfies diversified demands for customers, but too many specifications of spiral spring devices and rollers impose a large challenge to the manufacturers in terms of management of research, development, production, assembling, sale, and inventory. Therefore, for the purpose of cost controlling, the manufacturers can only produce curtains with limited standard sizes and limited number of curtains cloths, assemble the whole of curtains, and wholesale them to the retailers, which then sale the hovering rolling curtains to customers. This, however, seriously affect a market size of this kind of hovering rolling curtain, since curtains belong to highly customized products.

SUMMARY

In view of the above, the present application provides a rolling curtain and an assembling method thereof. In some embodiments, the present application provides a rolling curtain.

A rolling curtain provided in the present application adopts the following technical solution. A rolling curtain includes:

a roller, in which a stop strip is provided on an inner wall thereof and a half open curtain cloth groove is provided on an outer wall thereof;

a curtain cloth, in which an upper end thereof is fixedly connected in the curtain cloth groove by a snap-in strip;

a lower rod, which is horizontally arranged on a lower end of the curtain cloth;

a motor, which is mounted at an inner side of a first end of the roller and configured for driving the roller to rotate to lift the curtain cloth;

a spiral spring device, which is mounted at an inner side of a second end of the roller and includes a fixed shaft, an outer rotatable frame, a plurality of spiral springs and an inserting pin, in which a shaft hole is provided on the outer rotatable frame, the fixed shaft is inserted in the shaft hole of the outer rotatable frame, each of the plurality of the spiral springs with a first end thereof fixedly connected to the fixed shaft and a second end thereof fixedly connected the outer rotatable frame is sleeved on the fixed shaft, a rotation stop notch is provided on the outer rotatable frame, the rotation stop notch is engaged with the stop strip on the roller, the outer rotatable frame is synchronously rotated with the roller, pin holes corresponding to each other are provided on the fixed shaft and the outer rotatable frame respectively, each of the plurality of spiral springs is tightly screwed and mounted in the outer rotatable frame, and the inserting pin is inserted in the pin holes of the fixed shaft and the outer rotatable frame for fixedly connecting the fixed shaft to the outer rotatable frame; and a first fixed bracket and a second fixed bracket, which are positioned at the first end and the second end of the roller respectively and are configured for fixing the motor and the spiral spring device respectively.

In the above technical solution:

1. the roller in the present application is provided with a spiral spring device on one end and a motor on the other end. Since the torque force of the spiral spring device and the gravity of the curtain cloth are under a balance in a stroke of the curtain, the rolling curtain can hover or stop at any position, and only a small outer force is required for breaking the force balance by pushing or pulling to lift the curtain. Therefore, merely a motor with a relatively small torque is needed to drive the rolling curtain to lift. The resistance of the motor with small torque is also extremely small during a power cut, which has little impact on the force for manually lifting the rolling curtain, so that the hovering rolling curtain in the present application can be controlled by both manual and automatic operations. The curtain can be manually closed when there is a power cut or the remote controller is not available, improving use experience for a user.

2. In existing technologies, a special fixture is needed for a manufacturer needs to assemble a spiral spring device into a roller. In the roller, the spiral spring will abut against the inner wall of the roller, generating an extremely large friction force, so that it is hard to be disassembled. The spiral spring will be loosened if it is forced to be disassembled, so that the user cannot reassemble the spiral spring. The spiral spring device in the present application is newly designed, so that the hovering rolling curtain, especially the spiral spring device, can be assembled at retailers and even by a customer himself. Firstly, the fixed shaft is inserted in the shaft hole of the outer rotatable frame, one end of an appropriate number of the spiral springs is fixedly connected to the fixed shaft, so that the fixed shaft is rotatable relative to the outer rotatable frame to tighten the spiral spring. The other end of each of the spiral springs is fixedly connected to the outer rotatable frame after tightening. Finally, the pin holes of the fixed shaft and the outer rotatable frame are aligned with each other, and the inserting pin is inserted therein to finish the assembly of the spiral spring device. The assembled spiral spring device is inserted into one end of the roller, and then the inserting pin is pulled out, so that the spiral spring is loosened to finish the assembling of the spiral spring device and the roller. After the hovering rolling curtain is completely assembled, if it is found that the torque force of the spiral spring device and the gravity of the curtain cloth cannot under a balance state, the spiral spring device should be disassembled (if the spiral spring is too loose to be taken out due to a relative large friction force with the inner wall of the roller, it is required to screw and tighten the spiral spring device in this case and in detail the curtain cloth is pulled downwards for a certain distance, the inserting pin is inserted again, the spiral spring is tightened and the friction force between the spiral spring and the inner wall of the roller is reduced even to zero, so as to take out the spiral spring device easily). The amount of the spiral spring should be contrapuntally increased or decreased according to the actual condition. The new spiral spring device is assembled and inserted in the roller, the inserting pin is taken out, and it is checked whether the torque force of the spiral spring device and the gravity of the curtain cloth are under a balance. Generally, it is required to adjust once to satisfy the balance condition (increase or decrease one spiral spring) on the basis of user experience data. The torque force of the spiral spring device in the present application can be adjusted in a certain range at retailers or customers to satisfy the demands of different curtain cloth sizes and different curtain cloth materials for customers, further to meet the demand of highly customization, which is expected to expand the market size.

3. When customers want to change curtain cloths in different weights afterwards, the new spiral spring device should be replaced in an existing device, which, however, cannot be operated by the customers, so that the customers can only choose to change the whole rolling curtain, resulting in a high cost. In the present application, it is chosen to decrease or increase a spiral spring according to that the curtain cloth becomes lighter or heavier, obviously reducing the cost for replacement.

Preferably, a first stop plate is provided on the first fixed bracket, a first stop groove is provided on an outer end of the fixed shaft, the first stop plate is inserted in the first stop groove, a second stop plate is provided on the second fixed bracket, a second stop groove is provided on an outer end of the motor, and the second stop plate is inserted in the second stop groove.

In the above technical solution, since the fixed shaft and the motor themselves cannot be rotated, it is required an outer structure to fix them. A first stop plate is provided on the first fixed bracket, and a second stop plate is provided on the second fixed bracket in the present application to prevent the fixed shaft and the motor from being rotated. The first stop plate and the second stop plate also have a role of supporting, which can support the whole rolling curtain.

Preferably, a bearing is sleeved on a housing of the motor, the bearing matches with the inner wall of the roller, a driving plate is provided on a motor shaft of the motor, and the driving plate is interfered with the stop strip so that the driving plate drives the roller to rotate.

In the above technical solution, since the motor itself cannot be rotated, there is a friction force between the motor and the inner wall of the roller. The friction forces are hard to control and differ from each other between different rolling curtain. A bearing is provided between the motor and the inner wall of the roller in the present application, extremely reducing the friction force at this position. The rolling curtains produced by different batches have little difference, which is not easy to influence the balance condition of the hovering rolling curtain.

Preferably, a through hole is provided on an inner end of the spiral spring, a plurality of mounting planes are provided at corresponding positions on the fixed shaft, a screw hole is provided on each of the plurality of mounting planes, the first end of each of the plurality of spiral springs is fixedly connected to one of the plurality of mounting planes of the fixed shaft by screw, a hook is provided on the second end of each of the plurality of spiral springs, a traverse rod is provided on the outer rotatable frame, and the hooks are hooked on the traverse rod.

In the above technical solution, since the outer contour of the fixed shaft is an arc surface, which is not easy to mount the inner end of the spiral spring, so that the spiral spring is unstable and easily to be disassembled. A mounting plane (where the section of the fixed shaft has a D-shape) is provided on the fixed shaft, the inner end of the spiral spring has a certain radian, which could be understood as an elastic gasket, so that the inner end of the spiral spring can be well and stably fixed after locking by a screw.

Preferably, the spiral spring device further includes an auxiliary spiral spring, an auxiliary shaft and a key, two ends of the auxiliary shaft are rotatably provided in the shaft holes of two adjacent vertical partition plates respectively, the auxiliary spiral spring with one end fixed connected to the auxiliary shaft and the other end fixedly connected to the outer rotatable frame is sleeved on the auxiliary shaft, key holes are provided on centers of the fixed shaft and the auxiliary shaft, the key is inserted in the key hole of the auxiliary shaft from the keyhole of the fixed shaft, so that the fixed shaft and the auxiliary shaft are synchronously rotated.

Repeated disassembling and assembling of the spiral spring device for adjusting is also a tedious operation. In the above technical solution, an auxiliary spiral spring and an auxiliary shaft are provided in the present application in order to avoid this condition. Generally, the key is preferably inserted in the key hole of the auxiliary shaft, so that the fixed shaft and the auxiliary shaft are synchronously rotated, which can be regarded as one shaft. The auxiliary spiral spring has the same effect as the other spiral springs. The key can be taken out when the torque force of the spiral spring is too large in the adjusting process, so that the auxiliary shaft won't be synchronously rotated with the fixed shaft, which is equivalent that the auxiliary spiral spring is disused, having no function. The torque force of the spiral spring device and the gravity of the curtain cloth can under a balance. It is easy to adjust since the spiral spring device is not necessary to be disassembled.

Preferably, the auxiliary spiral spring has a same torsion variation curvature as that of the spiral spring, the torque force of the auxiliary spiral spring is smaller than that of the spiral spring in the same position.

In the above technical solution, since the torque force of the auxiliary spiral spring is an additional variable, which is a key factor for adjusting the torque force. If the torsion value of the auxiliary spiral spring is relatively large, it cannot play a role of adjusting. Therefore, the torque force of the auxiliary spiral spring in the present application is reduced.

Preferably, the spiral spring device further includes a plurality of auxiliary spiral springs and a plurality of auxiliary shafts, and the plurality of auxiliary shafts are coaxial arranged.

In the above technical solution, a plurality of auxiliary spiral springs are provided, and each of the auxiliary spiral springs can be used or disused, so as to enlarge the adjusting range of torque force of the spiral spring device, satisfying various demands of customers.

Preferably, the key holes and the key all have rectangular sections.

In the above technical solution, the rectangular key has a better transmission effect.

Preferably, a plurality of reserved holes for dodging the screws are provided on the key, and the reserved holes have an oblong shape.

In the above technical solution, the key in the present application needs to be moved back and forth, so a plurality of reserved holes for allowing the screws to move are provided on the key, the reserved holes have an oblong shape, so as to be moved back and forth in a certain range.

Preferably, the inner wall of the roller is a rough surface, configured for increasing the friction force between the spiral spring and the inner wall of the roller.

In the above technical solution, the spiral spring is loosened in the roller to abut against the inner wall of the roller. The inner wall of the roller in the present application is designed as a rough surface to increase the friction force between the spiral spring and the inner wall of the roller, prevent the axial movement of the spiral spring device in the interior of the roller when the spiral spring is tightened.

The present application provides another technical solution. An assembling method of the above hovering rolling curtain includes the following steps:

- mounting one end of the curtain cloth on the roller, and mounting the other end of the curtain cloth on the lower rod;
- winding the curtain cloth on the roller completely;
- assembling the spiral spring device, in which the fixed shaft is inserted in the shaft hole of the outer rotatable frame, and one end of the spiral spring is fixedly connected to the fixed shaft,
- so that the fixed shaft is rotated relative to the outer rotatable frame, the spiral spring is tightened, the other end of the spiral spring is fixedly connected to the outer rotatable frame after tightening, the pin holes of the fixed shaft and the outer rotatable frame are aligned, and the inserting pin is inserted;
- inserting the assembled spiral spring device in one end of the roller, and taking out the inserting pin, so that the spiral spring is loosened and abuts against the inner wall of the roller, the fixed shaft is rotated freely under the torque force of the spiral spring, and the spiral spring is restored to an initial operation state;
- inserting the motor in the other end of the roller;
- fixing the motor on the first fixed bracket; and
- fixing the spiral spring device on the second fixed bracket.

In the above technical solution, the assembling method in the present application can realize the assembling of the spiral spring at retailers or customers, which is convenient for assembling on site. The torque force of the spiral spring device can be adjusted in a certain range to satisfy the demands of different sizes and different materials of the curtain cloth for customers, further to meet the demand of highly customization, which is expected to expand the market size.

In conclusion, the present application can achieve at least one of the following beneficial effects:

1. The hovering rolling curtain in the present application could realize a control by both manual and automatic operations. The curtain can be manually closed when there is a power cut or a remote controller is not available, improving use experience for a user.
2. The spiral spring device in the present application is newly designed, so as to be assembled at retailers and even by the customers themselves. The torque force of the spiral spring device can be adjusted in a certain range to satisfy the demand of different curtain cloth sizes and different curtain cloth materials for customers, further to meet the demand of highly customization, which is expected to expand the market size.
3. In the present application, when customers want to change curtain cloths in different weights afterwards, it is chosen to decrease or increase a spiral spring according to that the curtain cloth becomes lighter or heavier, obviously reducing the replacement cost.
4. A bearing is provided between the motor and the inner wall of the roller in the present application, extremely reducing the friction force at this position. The rolling curtains produced by different batches have little difference, which is not easy to influence the balance condition of the hovering rolling curtain.

Figure 1:
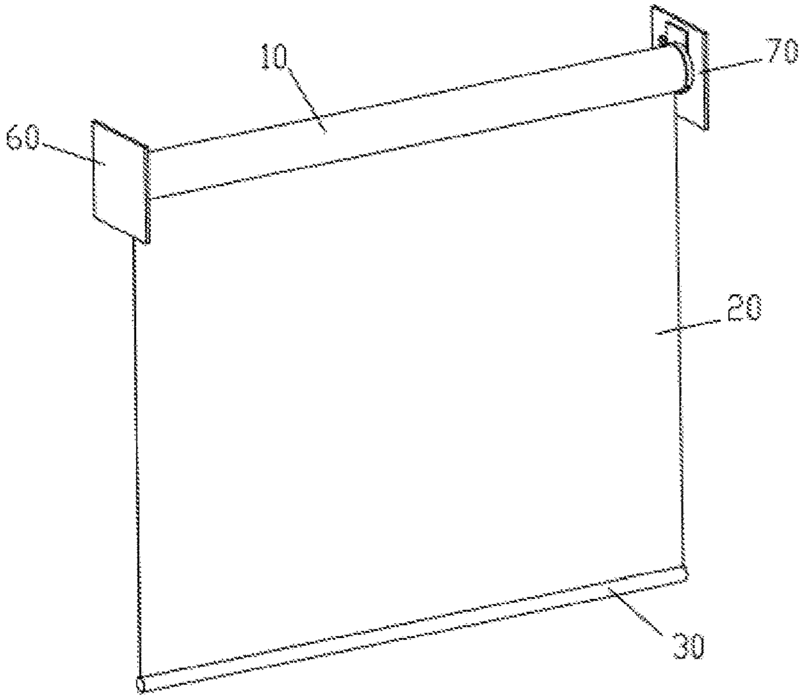
FIG. 1 shows an overall schematic diagram of a hovering rolling curtain according to Embodiment 1 of the present application.

Listing of reference signs: 10 roller; 11 stop strip; 12 curtain cloth groove; 20 curtain cloth; 21 snap-in strip; 30 lower rod; 40 motor; 41 second stop groove; 42 bearing; 43 driving plate; 50 spiral spring device; 51 fixed shaft; 511 pin hole; 512 first stop groove; 513 mounting plane; 514 screw hole; 515 screw; 516 key hole; 52 outer rotatable frame; 521 shaft hole; 522 rotation stop notch; 523 pin hole; 524 traverse rod; 525 vertical partition plate; 53 spiral spring; 531 through hole; 532 hook; 54 inserting pin; 55 auxiliary spiral spring; 56 auxiliary shaft; 564 key hole; 57 key; 571 reserved hole; 60 first fixed bracket; 61 first stop plate; 70 second fixed bracket; and 71 second stop plate.

DETAILED DESCRIPTION

The present application is further described in details below in combination with FIGS. 1-18.

Generally, a stroke length of a single spiral spring matches with the length of a curtain cloth, while a torsion curve of single spiral spring is not to be directly related to the gravity of the curtain cloth, as long as an appropriate number of spiral springs are provided to ensure that the torque force of the spiral spring matches with the gravity of the curtain cloth to realize a balance. Therefore, for a given length of a curtain cloth, a matching spiral spring, as well as an appropriate number thereof, can be chosen based on calculation or experience to match with curtain cloths of different materials and with different widths. The technical solutions of the present application are made based on this principle.

Embodiment 1

Referring to FIGS. 1-3 and FIG. 14, a rolling curtain disclosed in an embodiment of the present application includes a roller 10, a curtain cloth 20, a lower rod 30, a motor 40, a spiral spring device 50, a first fixed bracket 60 and a second fixed bracket 70. A stop strip 11 is provided on an inner wall of the roller 10. A semi-opened curtain cloth groove 12 is provided on an outer wall of the roller 10. An upper end of the curtain cloth 20 is fixedly connected in the curtain cloth groove 12 of the roller 10 by a snap-in strip 21. The lower rod 30 is horizontally arranged on a lower end of the curtain cloth 20. The motor 40 is mounted at an inner side of one end of the roller 10 and is configured for driving the roller 10 to rotate, further to lift the curtain cloth 20. The spiral spring device 50 is mounted at an inner side of the other end of the roller 10 for providing the hovering force. The first fixed bracket 60 and the second fixed bracket 70 are positioned at two ends of the roller 10 respectively and are configured for fixing the motor 40 and the spiral spring device 50 respectively. The material of the roller 10 generally adopts cylindrical extruded section bar.

Referring to FIG. 7, FIG. 8, FIG. 10 and FIG. 13, the spiral spring device 50 includes a fixed shaft 51, an outer rotatable frame 52, a plurality of spiral springs 53 and an inserting pin 54. A shaft hole 521 is provided on the outer rotatable frame 52. The fixed shaft 51 is inserted in the shaft hole 521 of the outer rotatable frame 52. The plurality of spiral springs 53 are sleeved on the fixed shaft 51, with one end thereof fixedly connected to the fixed shaft 51 and the other end thereof fixedly connected to the outer rotatable frame 52. A rotation stop notch 522 is provided on the outer rotatable frame 52. The rotation stop notch 522 is engaged with the stop strip 11 on the roller 10. The outer rotatable frame 52 is synchronously rotated with the roller 10. Pin holes 511, 523 corresponding to each other are provided on the fixed shaft 51 and the outer rotatable frame 52 respectively. Each of the plurality of spiral springs 53 is tightly screwed and mounted in the outer rotatable frame 52. The inserting pin 54 is inserted in the pin holes 511, 523 of the fixed shaft 51 and the outer rotatable frame 52 for fixedly connecting the fixed shaft 51 to the outer rotatable frame 52.

Figure 2:
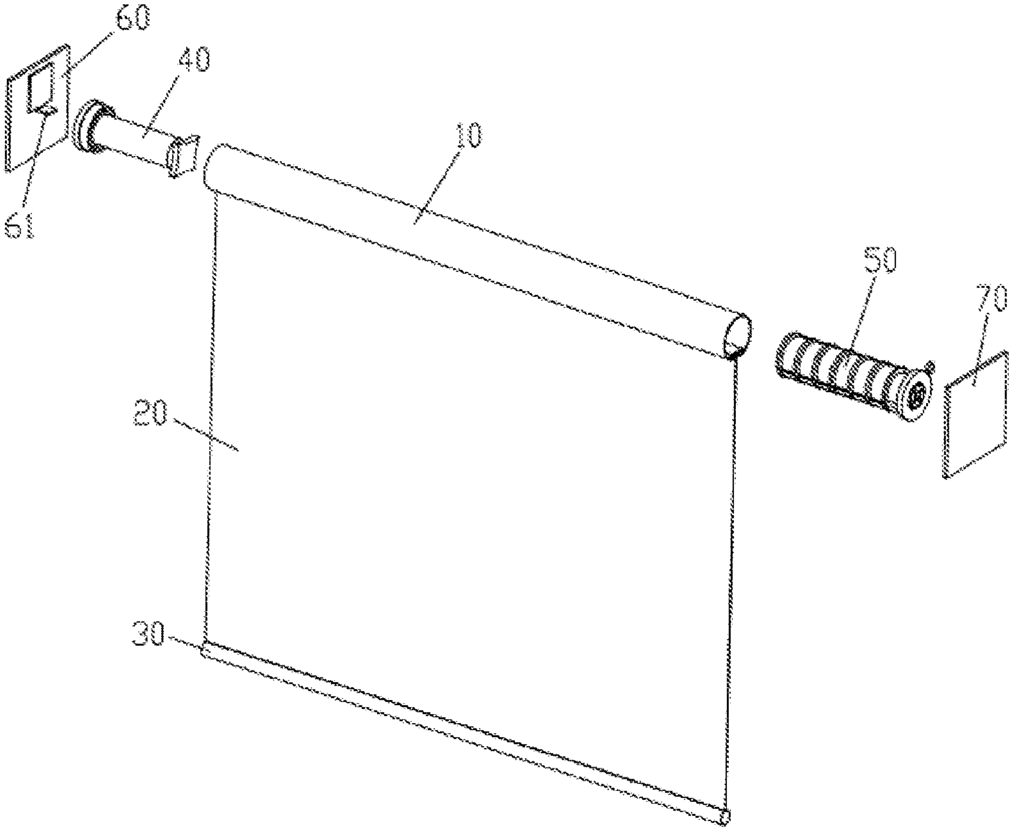
FIG. 2 shows a schematic diagram of a hovering rolling curtain in an explosion state according to Embodiment 1 of the present application.
Figure 3:
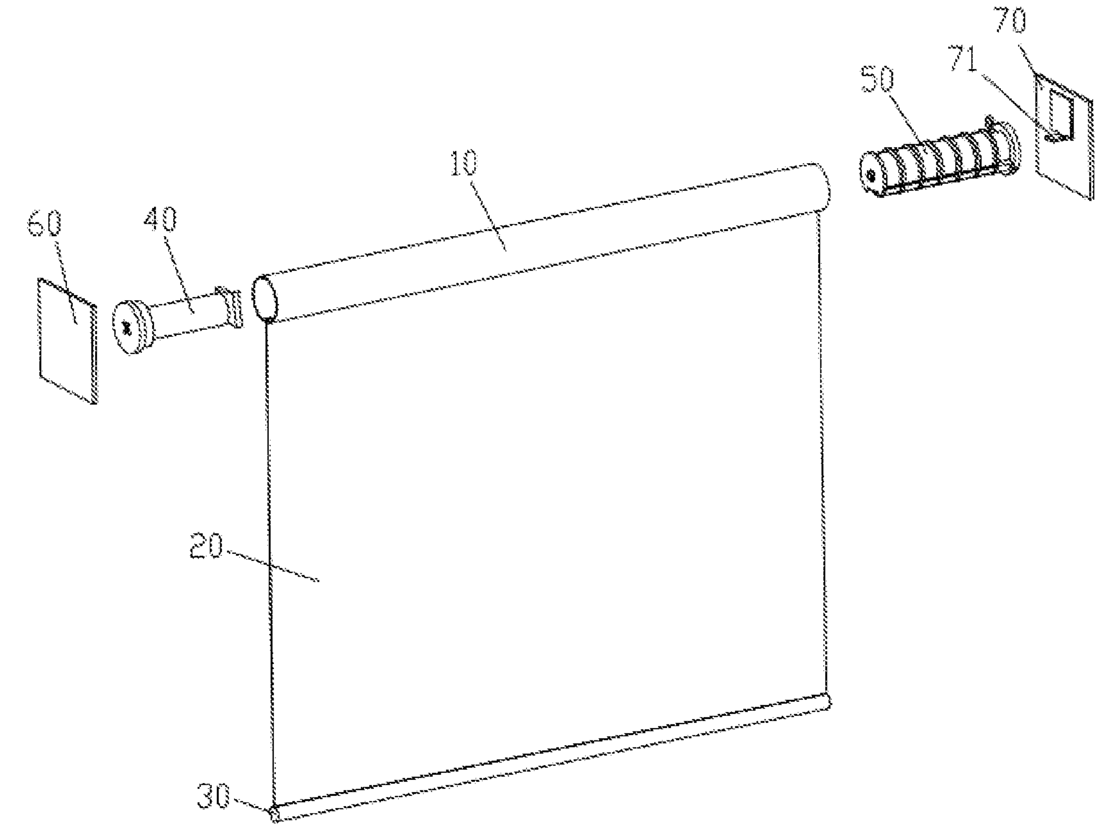
FIG. 3 shows an explosion structural schematic diagram from another angle of a hovering rolling curtain according to Embodiment 1 of the present application.
Figure 4:
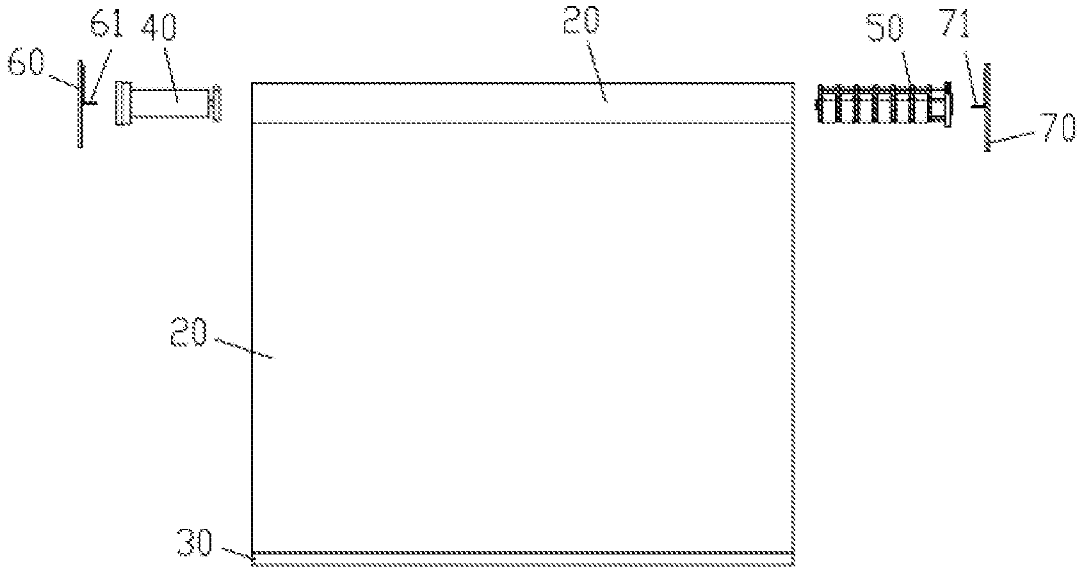
FIG. 4 shows a front view of an explosion structure of a hovering rolling curtain according to Embodiment 1 of the present application.

Referring to FIGS. 2-4, a first stop plate 61 is provided on the first fixed bracket 60. A first stop groove 512 is provided on an outer end of the fixed shaft 51. The first stop plate 61 is inserted in the first stop groove 512. A second stop plate 71 is provided on the second fixed bracket 70. A second stop groove 41 is provided on an outer end of the motor 40, and the second stop plate 71 is inserted in the second stop groove 41. Since the fixed shaft 51 and the motor 40 themselves cannot be rotated, it is required an outer structure to fix them. The first stop plate 61 is provided on the first fixed bracket 60, and the second stop plate 71 is provided on the second fixed bracket 70 in the present application to prevent the fixed shaft 51 and the motor 40 from being rotated. The first stop plate 61 and the second stop plate 71 also have a role of supporting, which can support the whole rolling curtain.

Figure 5:
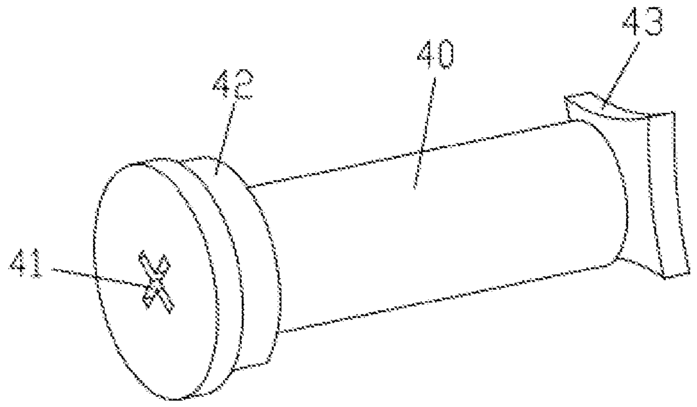
FIG. 5 shows a structural schematic diagram of a motor according to Embodiment 1 of the present application.
Figure 6:
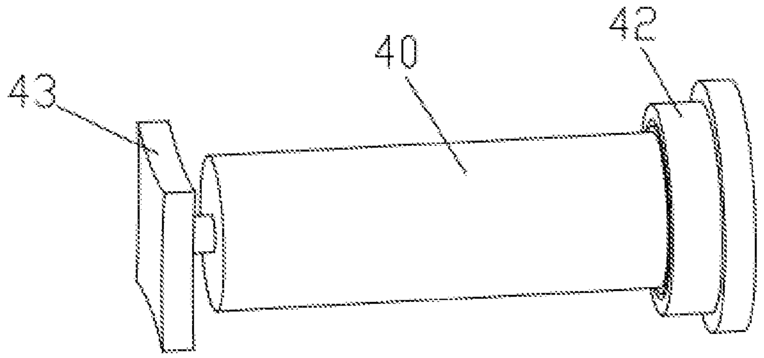
FIG. 6 shows a structural schematic diagram of a motor from another angle of view according to Embodiment 1 of the present application.
Figure 7:
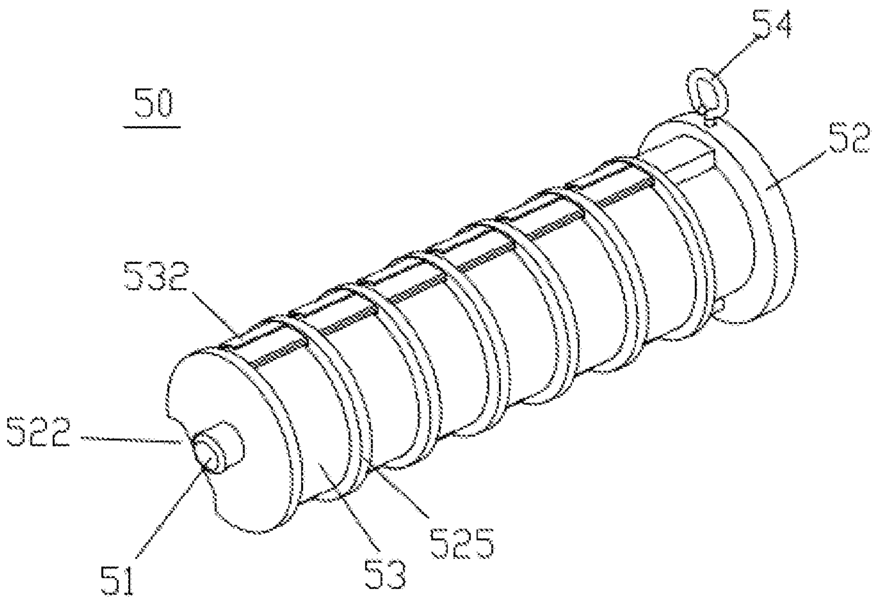
FIG. 7 shows a structural schematic diagram of a spiral spring device according to Embodiment 1 of the present application.
Figure 8:
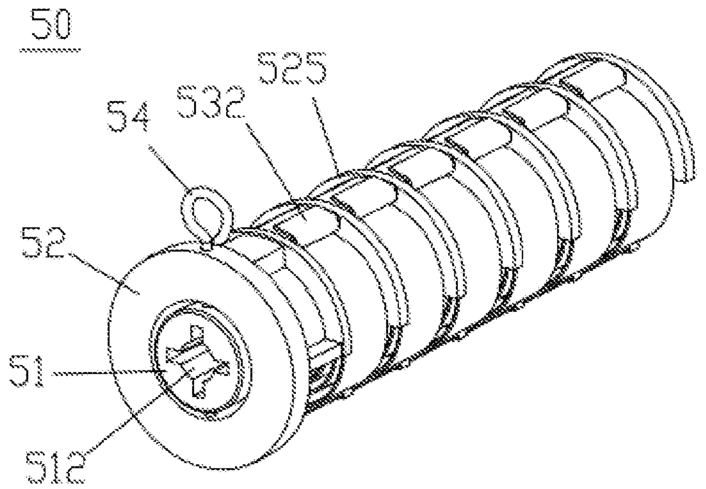
FIG. 8 shows a structural schematic diagram of a spiral spring device from another angle of view according to Embodiment 1 of the present application.
Figure 9:
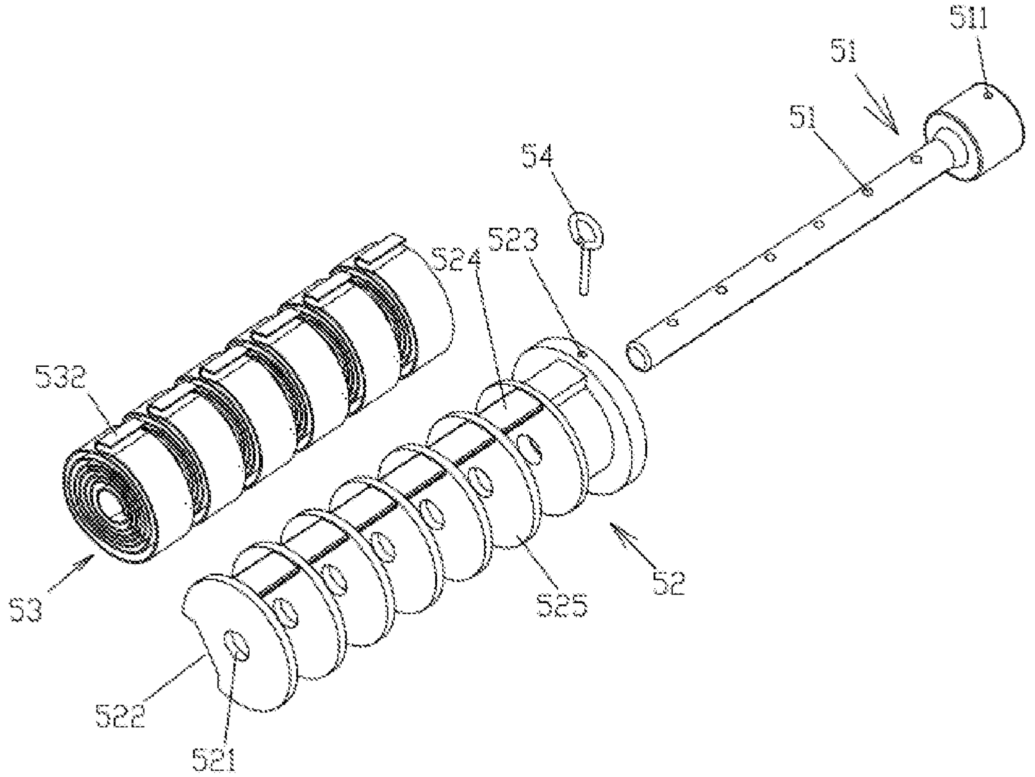
FIG. 9 shows an explosion structural schematic diagram of a spiral spring device according to Embodiment 1 of the present application.

Referring to FIG. 2, FIG. 5 and FIG. 6, a bearing 42 is sleeved on a housing of the motor 40. The bearing 42 is matched with the inner wall of the roller 10. A driving plate 43 is provided on a motor shaft of the motor 40. The driving plate 43 is interfered with the stop strip 43 so that the driving plate 43 drives the roller 10 to rotate. Since the motor 40 itself cannot be rotated, there is a friction force between the motor 40 and the inner wall of the roller 10. The friction forces are hard to control and differ from each other between different rolling curtains. The bearing 42 is provided between the motor 40 and the inner wall of the roller 10 in the present application, extremely reducing the friction force at this position. The rolling curtains produced by different batches have little difference, which is not easy to influence the balance condition of the hovering rolling curtain.

Figure 10:
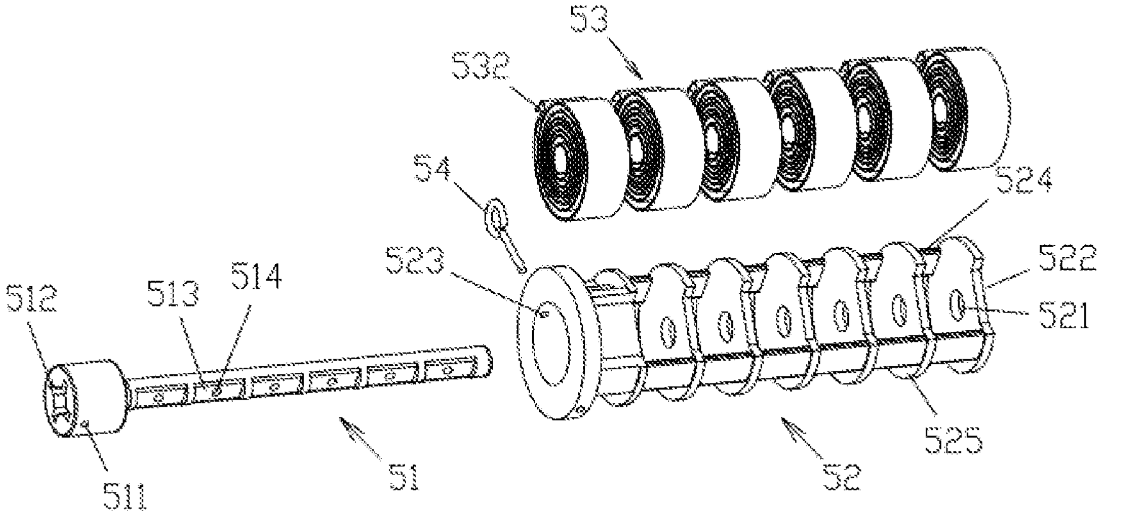
FIG. 10 shows an explosion structural schematic diagram of a spiral spring device from another angle of view according to Embodiment 1 of the present application.
Figure 11:
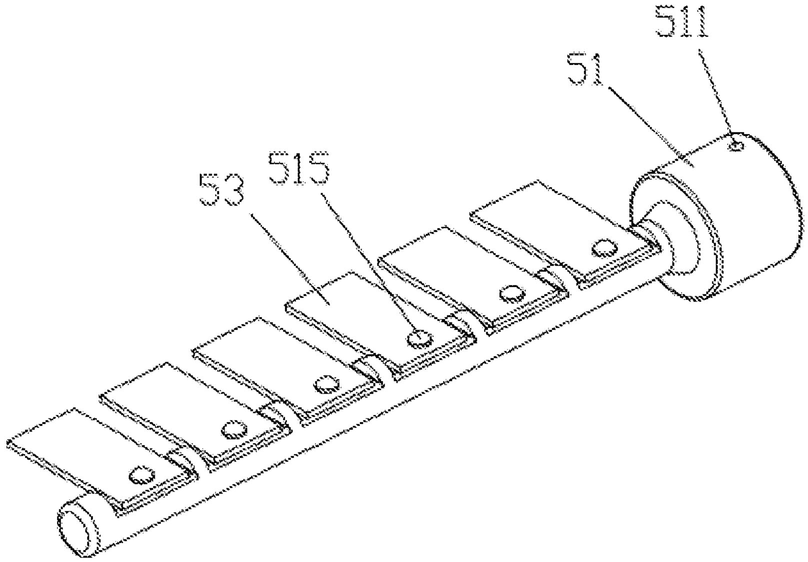
FIG. 11 shows a schematic diagram of a fitting relationship between an inner end of a spiral spring and a fixed shaft according to Embodiment 1 of the present application.
Figure 12:
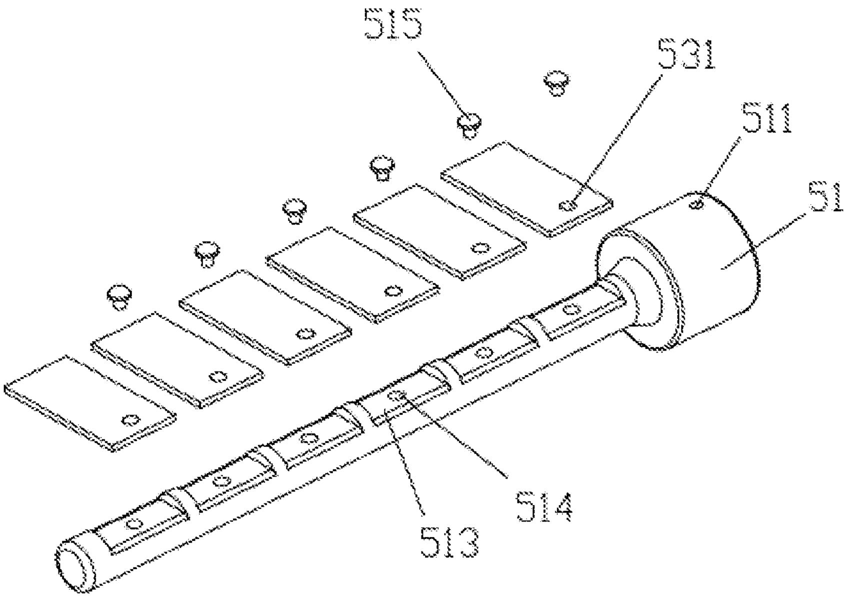
FIG. 12 shows a schematic diagram showing the assembling of an inner end of a spiral spring and a fixed shaft according to Embodiment 1 of the present application.
Figure 13:
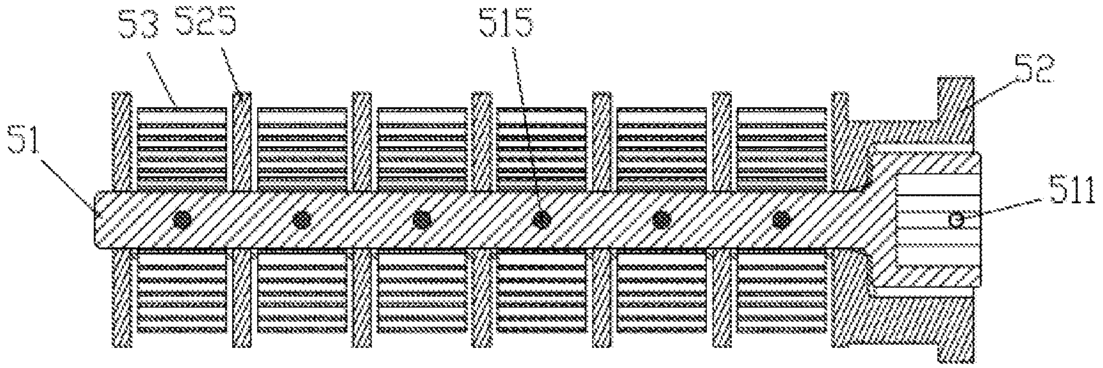
FIG. 13 shows a half-cutaway schematic diagram of a spiral spring device according to Embodiment 1 of the present application.
Figure 14:
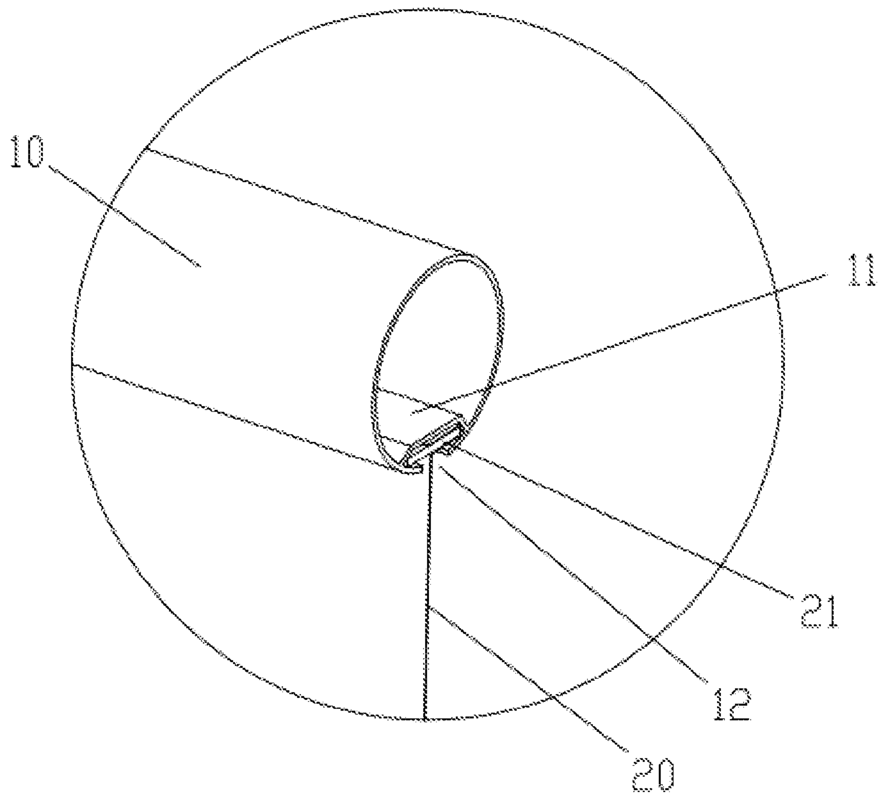
FIG. 14 shows a schematic diagram of an assembling relationship between a curtain cloth and a roller according to Embodiment 1 of the present application.
Figure 15:
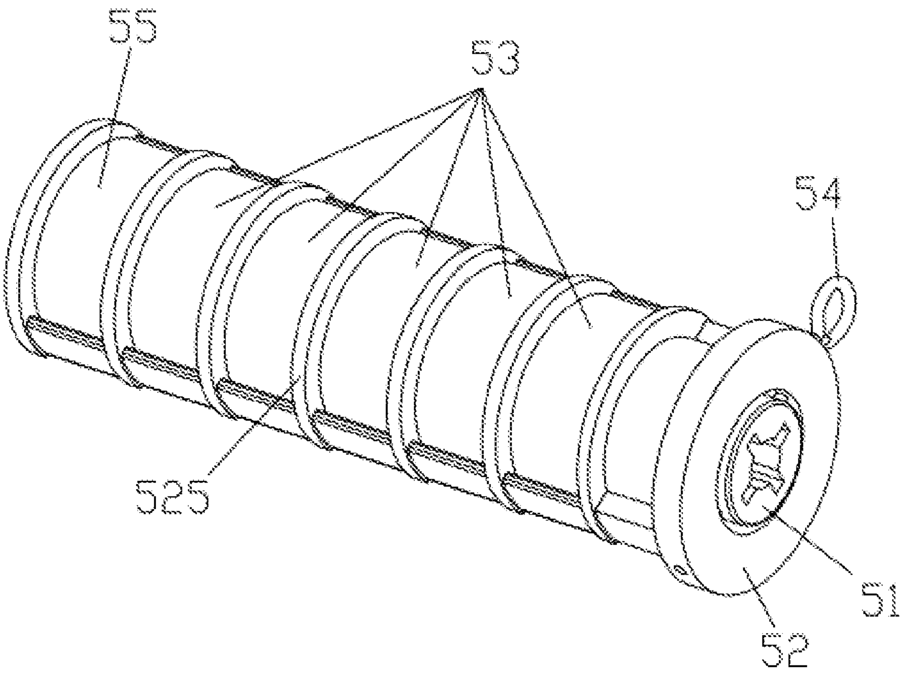
FIG. 15 shows a structural schematic diagram of a spiral spring device according to Embodiment 2 of the present application.
Figure 16:
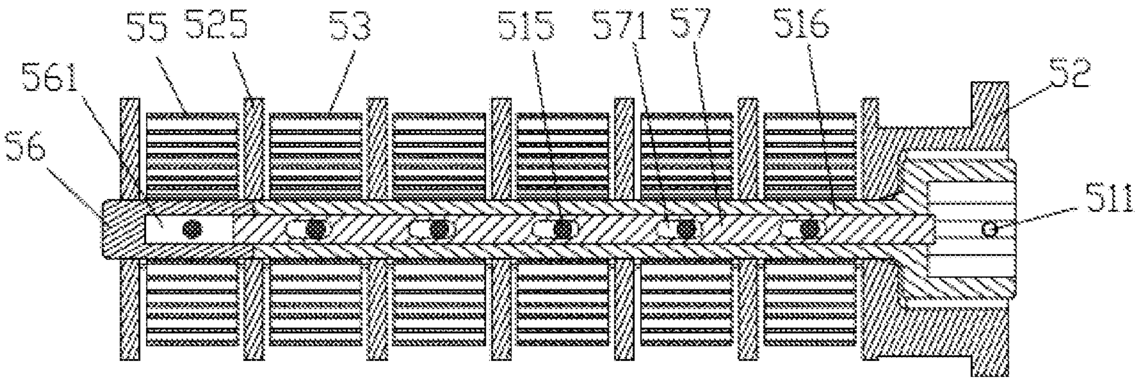
FIG. 16 shows an explosion schematic diagram of a spiral spring device according to Embodiment 2 of the present application.
Figure 17:
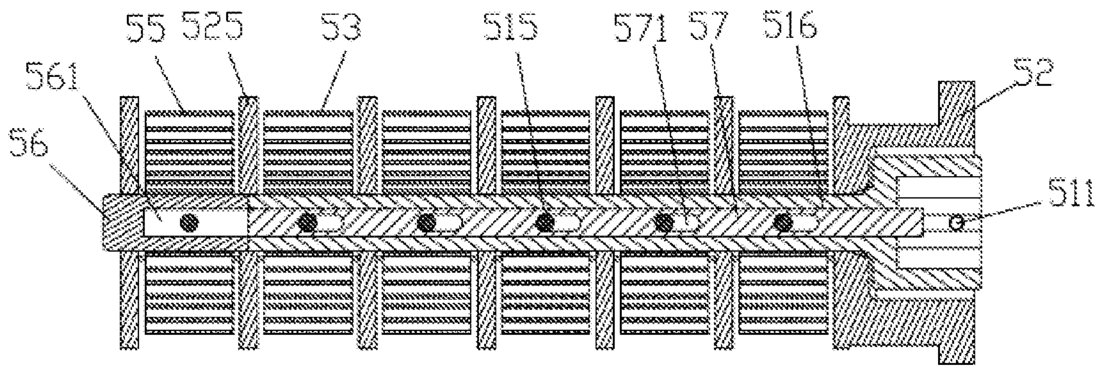
FIG. 17 shows a half-cutaway schematic diagram of a spiral spring device according to Embodiment 2 of the present application (using state).

Referring to FIGS. 10-12, a through hole 531 is provided on an inner end of each of the plurality of spiral springs 53. A plurality of mounting planes 513 are provided at corresponding positions on the fixed shaft 51. A screw hole 514 is provided on each of the plurality of mounting planes 513. The inner end of each of the plurality of spiral springs 53 is fixedly connected to one of the plurality of mounting planes 513 of the fixed shaft 51 by screw 515. A hook 532 is provided on an outer end of each of the plurality of spiral springs 53. A traverse rod 524 is provided on the outer rotatable frame 52. The hooks 532 are hooked on the traverse rod 524. Since the outer contour of the fixed shaft 51 is an arc surface, which is not easy to mount the inner end of the spiral spring 53, so that the spiral spring 53 is unstable and easily to be disassembled. The mounting plane 513 (where the section of the fixed shaft 51 has a D-shape) is provided on the fixed shaft 51, the inner end of the spiral spring 53 has a certain radian, which could be understood as an elastic gasket, so that the inner end of the spiral spring 53 can be well and stably fixed after locking by screw 515.

In this embodiment, the inner wall of the roller 10 is rough surface, which is configured for increasing the friction force between the spiral spring 53 and the inner wall of the roller 10. The spiral spring 53 is loosened to abut against the inner wall of the roller 10. The inner wall of the roller 10 in the present application is designed as a rough surface to increase the friction force between the spiral spring 53 and the inner wall of the roller 10, prevent the axial movement of the spiral spring device 50 in the interior of the roller 10 when the spiral spring 53 is tightened.

The assembling method of the above hovering rolling curtain includes the following steps:

- mounting one end of the curtain cloth 20 on the roller 10, and mounting the other end of the curtain cloth 20 on the lower rod 30;
- winding the curtain cloth 20 on the roller 10 completely;
- assembling the spiral spring device 50, in which the fixed shaft 52 is inserted in the shaft hole 521 of the outer rotatable frame 52, one end of the spiral spring 53 is fixedly connected to the fixed shaft 51, so that the fixed shaft 51 is rotated relative to the outer rotatable frame 52, the spiral spring 53 is tightened, the other end of the spiral spring 53 is fixedly connected to the outer rotatable frame 52 after tightening, the pin holes 511, 523 of the fixed shaft 51 and the outer rotatable frame 52 are aligned, and the inserting pin 54 is inserted;
- inserting the assembled spiral spring device 50 in one end of the roller 10, and taking out the inserting pin 54, so that the spiral spring 53 is loosened and abutted against the inner wall of the roller 10, the fixed shaft 51 is rotated freely under the torque force of the spiral spring 53, and the spiral spring 53 is returned to an initial operation state;
- inserting the motor 40 in the other end of the roller 10;
- fixing the motor 40 on the first fixed bracket 60; and
- fixing the spiral spring device 50 on the second fixed bracket 70.

The detail sequence of the steps is not limited in the present application, some steps can be exchanged, for example, there is no difference whether mounting the motor 40 firstly or mounting the spiral spring device 50 firstly, which are both feasible.

The implementation principle of the present application is: 1. the roller 10 in the present application is provided with a spiral spring device 50 on one end and a motor 40 on the other end. Since the torque force of the spiral spring device 50 and the gravity of the curtain cloth 20 are under a balance in the stroke of the curtain, the hovering rolling curtain can hover at any position. It is required only a small outer force to break the force balance (it is required to against the friction of the system and the resistance of the motor 40), and to push or pull to lift the curtain. Therefore, it is required a motor 40 with a relatively small torque to drive the rolling curtain to lift. The resistance of the small torque motor is also extremely small during power cut, which has little impact on the force for manually lifting the rolling curtain, so that the hovering rolling curtain in the present application could realize a function of manual and automatic integration. The curtain can be manually closed when power cut or the remote controller is missing, improving the using experience of users.

2. The spiral spring device 50 in the present application is newly designed, so that the hovering rolling curtain in particular the spiral spring device 50 can be assembled at retailers and even by the customers themselves. Firstly, the fixed shaft 51 is inserted in the shaft hole 521 of the outer rotatable frame 52, the spiral springs 53 in an appropriate amount each have one end thereof fixedly connected to the fixed shaft 51, so that the fixed shaft 51 is rotatable relative to the outer rotatable frame 52, then the spiral spring 53 is tightened. The other end of each spiral spring 53 is fixedly connected to the outer rotatable frame 52 after tightening. Finally, the pin holes 511, 523 of the fixed shaft 51 and the outer rotatable frame 52 are aligned, and the inserting pin 54 is inserted therein, so as to finish the assembly of the spiral spring device 50. The assembled spiral spring device 50 is inserted in one end of the roller 10, then the inserting pin 54 is taken out, and the spiral spring 53 is loosened, so as to finish the assembly of the spiral spring device 50 and the roller 10. After the hovering rolling curtain is completely assembled, if it is found that the torque force of the spiral spring device 50 and the gravity of the curtain cloth 10 cannot under a balance state, the spiral spring device 50 should be disassembled (if the spiral spring 53 is too loose to be taken out due to a relative large friction force with the inner wall of the roller 10, it is required to screw and tighten the spiral spring device 50 in this case and in detail the curtain cloth 20 is pulled downwards for a certain distance, the inserting pin 54 is inserted again, the spiral spring 53 is tightened and the friction force between the spiral spring 53 and the inner wall of the roller 10 is reduced even to zero, so as to take out the spiral spring device easily). The amount of the spiral spring 53 should be contrapuntally increased or decreased according to the actual condition. The new spiral spring device 50 is assembled and inserted in the roller 10, the inserting pin 54 is taken out, and it is checked whether the torque force of the spiral spring device 50 and the gravity of the curtain cloth 20 are under a balance. Generally, it is required to adjust once to satisfy the balance condition (increase or decrease one spiral spring 53) on the basis of the using experience data. The torque force of the spiral spring device 50 in the present application can be adjusted in a certain range at retailers or customers to satisfy the demand of different curtain cloth 20 sizes and different curtain cloth 20 materials for customers, further to meet the demand of highly customization, which is expected to expand the market size.

3. When customers want to change curtain cloth 20 in different weights afterwards, the new spiral spring device 50 should be replaced in the existing technology, which cannot be operated by the customers, so that the customers can only choose to change the whole rolling curtain, which has a high cost. In the present application, it is chosen to decrease or increase a spiral spring 53 according to that the curtain cloth 20 becomes lighter or heavier, obviously reducing the replacement cost.

The spiral spring device 50 in the Embodiment 1 is required to be disassembled repeatedly, and the adjusting is also a tedious operation. Embodiment 2 is provided in the present application in order to prevent this situation.

Embodiment 2

Referring to FIG. 15 FIG. 16, FIG. 17 and FIG. 18, it differs from Embodiment 1 in that the spiral spring device 50 further includes an auxiliary spiral spring 55, an auxiliary shaft 56 and a key 57. Two ends of the auxiliary shaft 56 are rotatably provided in the shaft holes 521 of two adjacent vertical partition plates 525 respectively. The auxiliary spiral spring 55 with one end fixed connected to the auxiliary shaft 56 and the other end fixedly connected to the outer rotatable frame 52 is sleeved on the auxiliary shaft 56. Key holes 516, 561 are provided both on the fixed shaft 51 and the auxiliary shaft 56. The key 57 is inserted in the key hole 561 of the auxiliary shaft 56 from the keyhole 516 of the fixed shaft 51, so that the fixed shaft 51 and the auxiliary shaft 56 are synchronously rotated.

In this embodiment, the auxiliary spiral spring 55 has a same torsion variation curvature with that of the spiral spring 53, the torque force of the auxiliary spiral spring 55 is smaller that of the spiral spring 53 in the same position. Since the torque force of the auxiliary spiral spring 55 is an additional variable, which is a key factor for adjusting the torque force. If the torsion value of the auxiliary spiral spring 55 is relatively large, it cannot play a role of adjusting. Therefore, the torque force of the auxiliary spiral spring 55 in the present application is reduced. Under the same processing technology, the width of the auxiliary spiral spring 5 is designed to be smaller than the width of the spiral spring 53. For a simple example, the curtain cloth 20 is pushed to lift when the target pulling force of the hovering rolling curtain reaches 0.3 kG (it is required to against the friction of the system and the resistance of the motor), and it is better to provide a tolerance of 0.3 kG by the torque force of the auxiliary spiral spring 55.

Figure 18:
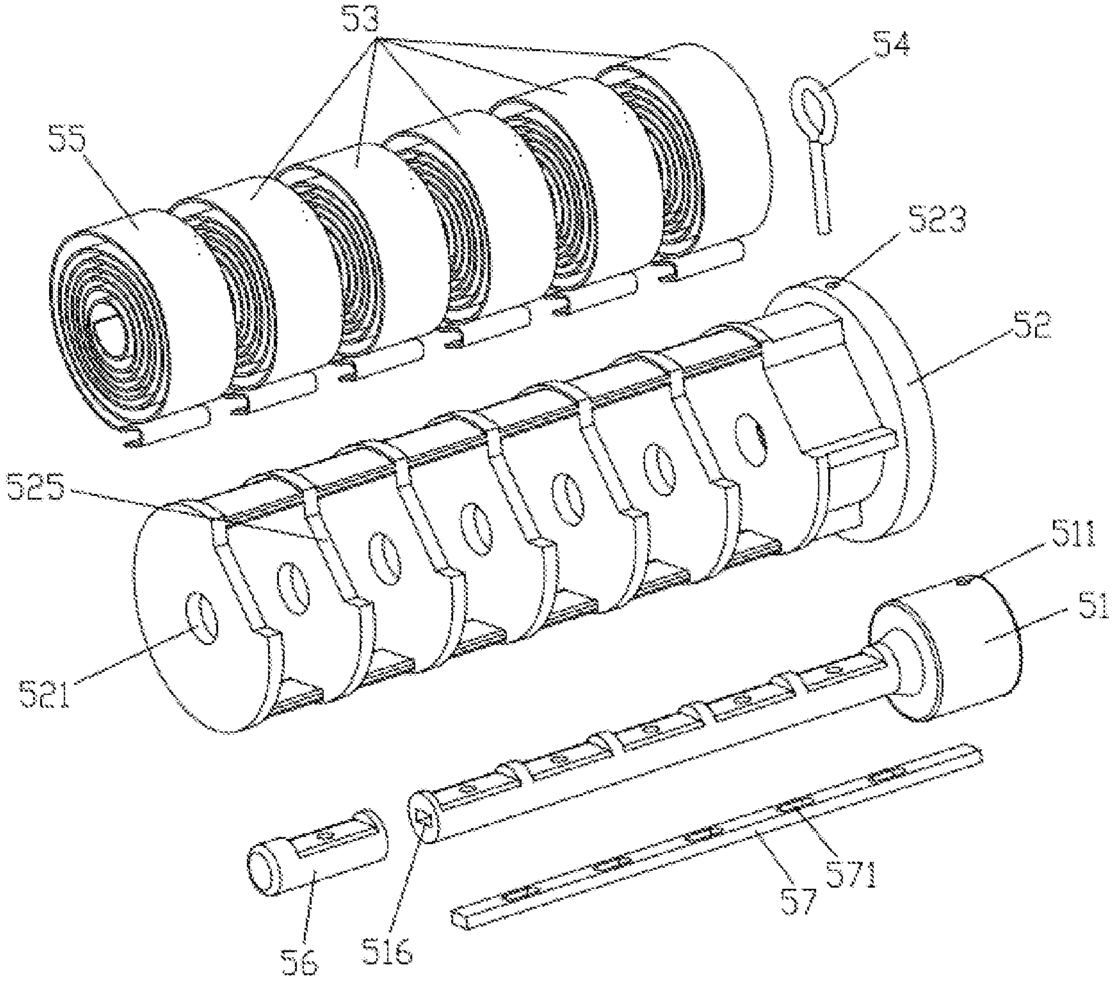
FIG. 18 shows a half-cutaway schematic diagram of a spiral spring device in another state according to Embodiment 2 of the present application (disusing state).

Referring to FIG. 18, the key holes 516, 561 and the key 57 all have rectangular sections. The rectangular key 57 has a better transmission effect. A plurality of reserved holes 571 for dodging the screws 515 are provided on the key 57, and the reserved holes 571 have an oblong shape. The key 57 in the present application needs to be moved back and forth, so a plurality of reserved holes 571 for dodging the screws 515 are provided on the key 57, the reserved holes 571 have an oblong shape, so as to be moved back and forth in a certain range.

When the screwing depth of the screw 515 is relatively small, the screw 515 is not interfered with key 57, and has no impact on inserting or taking out the key 57, the reserved holes 571 can also be omitted.

The implementation principle of this embodiment is that: the auxiliary spiral spring 55 and the auxiliary shaft 56 are provided in the present application. Generally, the key 57 is preferably inserted in the key holes 516, 561 of the auxiliary shaft 56, so that the fixed shaft 51 and the auxiliary shaft 56 are synchronously rotated, which can be regarded as one shaft. The auxiliary spiral spring 55 has the same effect as the other spiral springs 53. The key 57 can be taken out when the torque force of the spiral spring device 50 is too large in the adjusting process, so that the auxiliary shaft 56 won't be synchronously rotated with the fixed shaft 51, which is equivalent that the auxiliary spiral spring 55 is disused, having no function. The torque force of the spiral spring device 50 and the gravity of the curtain cloth 20 can reach a balance. It is easy to adjust since the spiral spring device 50 is not necessary to be disassembled.

Embodiment 3

Figure 19:
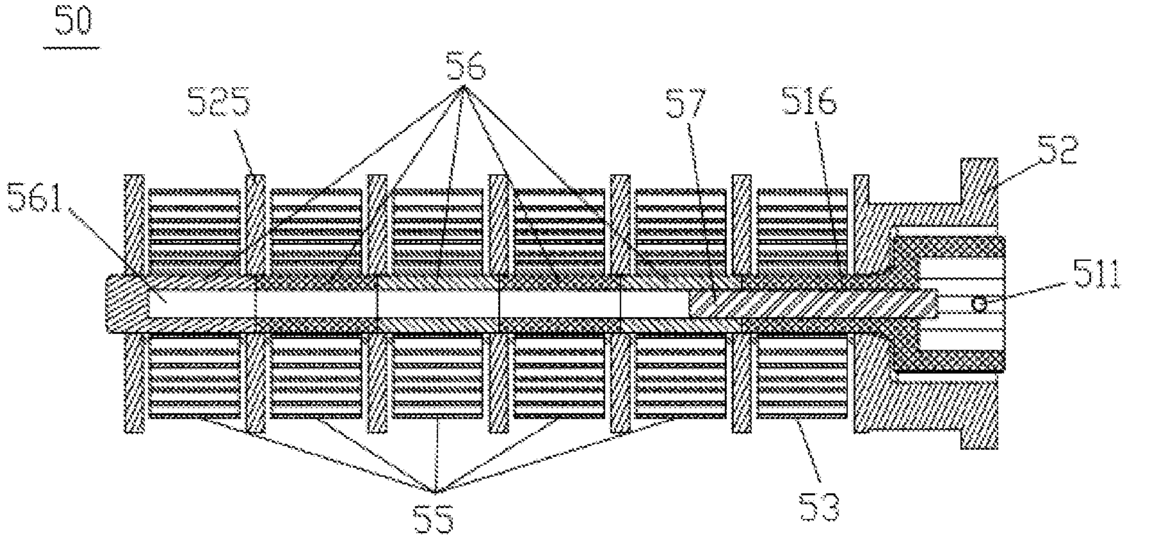
FIG. 19 shows a half-cutaway schematic diagram of a spiral spring device according to Embodiment 3 in the present application (using one auxiliary spiral spring).
Figure 20:
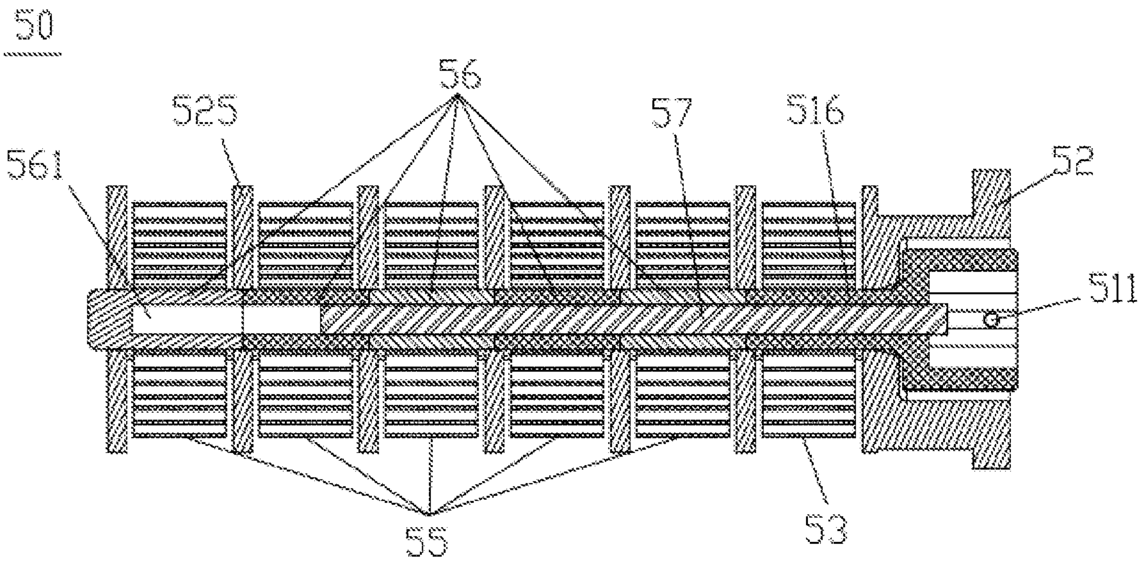
FIG. 20 shows a half-cutaway schematic diagram of a spiral spring device according to Embodiment 2 of the present application (using four auxiliary spiral springs).

Referring to FIG. 19 and FIG. 20, it differs from Embodiment 2 in that: the spiral spring device 50 includes a plurality of auxiliary spiral springs 55 and a plurality of auxiliary shafts 56, and the plurality of auxiliary shafts 56 are coaxial arranged. The detail amount thereof is five. The plurality of auxiliary spiral springs 55 are provided, each auxiliary spiral spring 55 can be used or disused, so as to enlarge the adjusting range of torque force of the spiral spring device 50, satisfying changeable demands of customers, it becomes a universal spiral spring device 50 in theory. The detail realizing method is inserting keys 57 with different lengths, for example, some of the keys 57 only drive one auxiliary shaft 56 (referring to FIG. 19), some of the keys 57 can drive four auxiliary shafts 56 (referring to FIG. 20), and so on.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A rolling curtain, comprising:

a roller, wherein a stop strip is provided on an inner wall of the roller and a half open curtain cloth groove is provided on an outer wall of the roller;

a curtain cloth, wherein an upper end of the curtain cloth is fixedly connected in the half open curtain cloth groove;

a motor, mounted at an inner side of a first end of the roller and configured for driving the roller to rotate to lift the curtain cloth;

a spiral spring device, mounted at an inner side of a second end of the roller and comprising a fixed shaft, an outer rotatable frame, a plurality of spiral springs and an inserting pin, wherein a shaft hole is provided on the outer rotatable frame, the fixed shaft is inserted in the shaft hole of the outer rotatable frame, the plurality of spiral springs are sleeved on the fixed shaft side by side, a plurality of vertical partition plates for separating adjacent spiral springs of the plurality of spiral springs are provided on the outer rotatable frame, a first end of each of the plurality of spiral springs is fixedly connected to the fixed shaft and a second end of each of the plurality of spiral springs is fixedly connected the outer rotatable frame, a rotation stop notch is provided on the outer rotatable frame, the rotation stop notch is engaged with the stop strip on the roller, the outer rotatable frame is synchronously rotated with the roller, pin holes corresponding to each other are provided on the fixed shaft and the outer rotatable frame respectively, each of the plurality of spiral springs is mounted in the outer rotatable frame, and the inserting pin is inserted in the pin holes of the fixed shaft and the outer rotatable frame for fixedly connecting the fixed shaft to the outer rotatable frame; and a first fixed bracket and a second fixed bracket, which are positioned at the first end and the second end of the roller respectively and are configured for fixing the motor and the spiral spring device respectively.

2. The rolling curtain according to claim 1, wherein a first stop plate is provided on the first fixed bracket, a first stop groove is provided on an outer end of the fixed shaft, the first stop plate is disposed in the first stop groove, a second stop plate is provided on the second fixed bracket, a second stop groove is provided on an end of the motor, and the second stop plate is disposed in the second stop groove.

3. The rolling curtain according to claim 1, wherein a bearing is sleeved on a housing of the motor, the bearing matches with the inner wall of the roller, a driving plate is provided on a motor shaft of the motor, and the driving plate abuts against the stop strip so that the driving plate drives the roller to rotate.

4. The rolling curtain according to claim 1, wherein a through hole is provided on the first end of each of the plurality of spiral springs, a plurality of mounting planes are provided on the fixed shaft, a screw hole is provided on each of the plurality of mounting planes, the first end of each of the plurality of spiral springs is fixedly connected to one of the plurality of mounting planes of the fixed shaft by a screw, a hook is provided on the second end of each of the plurality of spiral springs, a traverse rod is provided on the outer rotatable frame, and the hooks are hooked on the traverse rod.

5. The rolling curtain according to claim 1, wherein the spiral spring device further comprises an auxiliary spiral spring, an auxiliary shaft and a key, two ends of the auxiliary shaft are rotatably provided in shaft holes of two adjacent vertical partition plates respectively, the auxiliary spiral spring with a first end fixedly connected to the auxiliary shaft and a second end fixedly connected to the outer rotatable frame is sleeved on the auxiliary shaft, key holes are provided on the fixed shaft and the auxiliary shaft, and the key is inserted in the key hole of the auxiliary shaft from the key hole of the fixed shaft, so that the fixed shaft and the auxiliary shaft are synchronously rotated.

6. The rolling curtain according to claim 5, wherein the auxiliary spiral spring has a same torsion variation curvature as that of each of the plurality of spiral springs, and a torque force of the auxiliary spiral spring is smaller than that of each of the plurality of spiral springs in a same position.

7. The rolling curtain according to claim 5, wherein a plurality of holes in an oblong shape are provided in the key.

8. The rolling curtain according to claim 5, wherein the key holes and the key have rectangular sections.

9. The rolling curtain according to claim 5, wherein the spiral spring device further comprises a plurality of auxiliary spiral springs and a plurality of auxiliary shafts, and the plurality of auxiliary shafts are coaxial arranged.

10. The rolling curtain according to claim 1, wherein the inner wall of the roller is a rough surface.

11. An assembling method of the rolling curtain according to claim 1, comprising the following steps:

mounting one end of the curtain cloth on the roller;

winding the curtain cloth on the roller completely;

assembling the spiral spring device, wherein the fixed shaft is inserted in the shaft hole of the outer rotatable frame, the first end of each of the plurality of spiral springs is fixedly connected to the fixed shaft, so that the fixed shaft is rotated relative to the outer rotatable frame, each of the plurality of spiral springs is tightened, the second end of each of the plurality of spiral springs is fixedly connected to the outer rotatable frame, the pin holes of the fixed shaft and the outer rotatable frame are aligned with each other, and the inserting pin is inserted;

inserting the spiral spring device in the second end of the roller, and taking out the inserting pin, so that each of the plurality of spiral springs is unwound to press against the inner wall of the roller, the fixed shaft is rotated freely under a torque force of each of the plurality of spiral springs, and each of the plurality of spiral springs is in an initial operation state;

inserting the motor into the first end of the roller;

fixing the motor on the first fixed bracket; and fixing the spiral spring device on the second fixed bracket.

* * * * *